R. H. MADSEN.
COASTER BRAKE LINING.
APPLICATION FILED FEB. 26, 1918.

1,272,690.

Patented July 16, 1918.

Inventor:
Rasmus H. Madsen,
by Hazard & Miller
Att'ys.

UNITED STATES PATENT OFFICE.

RASMUS H. MADSEN, OF HOLLYWOOD, CALIFORNIA.

COASTER-BRAKE LINING.

1,272,690.     Specification of Letters Patent.     Patented July 16, 1918.

Application filed February 26, 1918. Serial No. 219,334.

*To all whom it may concern:*

Be it known that I, RASMUS H. MADSEN, a citizen of the United States, residing at Hollywood, in the county of Los Angeles and State of California, have invented new and useful Improvements in Coaster-Brake Linings, of which the following is a specification.

My object is to make a lining for repairing worn coaster brakes, and my invention consists in the novel features herein shown, described and claimed.

Figure 1:
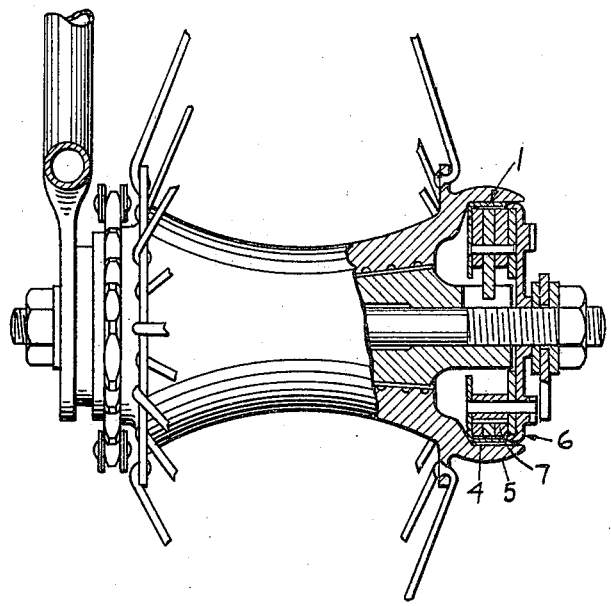
Figure 1 is a fragmentary view, partly in section, of a bicycle hub and axle and coaster brake showing my new lining in position for use.
Figure 2:
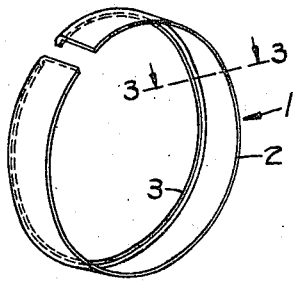
Fig. 2 is a perspective of the lining.
Figure 3:
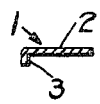
Fig. 3 is a cross-section on the line 3—3 of Fig. 2.

The coaster brake lining 1 comprising a strip of metal about three-eighths of an inch wide and long enough to reach around the brake shoe, made of good material anywhere from twenty-two to thirty gage, and bent into a circle to make the brake shoe band 2 and bent along one edge about a sixteenth of an inch from the edge to make the retaining flange 3. The ends of the band are not fastened together but simply abut together.

The lining thus constructed is inserted into the seat 4 within the hub rim 5 and is held in place by expansion against the seat 4. The coaster brake mechanism 6 fits within the rim 5 and the brake shoe 7 of the coaster brake mechanism fits within the band 2.

When a coaster brake has been used until the brake shoe 7 is worn, the lining is placed in position to make up for the wear so that the brake shoe will fit tight and the brake will hold.

The use of the lining will make the coaster brake safer and will avoid the necessity of throwing away the worn brake and will add to the comfort of the rider of an old bicycle.

The lining is especially intended to fit the coaster brake of the "New Departure" bicycle but may be made to fit other coaster brakes.

I claim:

A coaster brake lining comprising a band formed of a strip of metal bent to a circle with its ends abutting together, and a flange bent inwardly from one edge of the band; the lining being adapted to fit expansively in the rim of a hub around a coaster brake shoe.

In testimony whereof I have signed my name to this specification.

RASMUS H. MADSEN.